United States Patent [19]

Forslund et al.

[11] 4,193,294
[45] Mar. 18, 1980

[54] MAGNETOELASTIC TRANSDUCER WITH LINEAR AND TEMPERATURE-INDEPENDENT CHARACTERISTIC

[75] Inventors: Lennart Forslund, Brunflo; Stig Jordinger; Pavel Kolavčič, both of Vesteras, all of Sweden

[73] Assignee: ASEA Aktiebolag, Vesteras, Sweden

[21] Appl. No.: 863,531

[22] Filed: Dec. 22, 1977

[30] Foreign Application Priority Data

Dec. 28, 1976 [SE] Sweden .................................. 7614600

[51] Int. Cl.$^2$ ............................................... G01L 1/12
[52] U.S. Cl. .............................. 73/141 A; 73/DIG. 2
[58] Field of Search ..................... 73/141 A, DIG. 2; 324/209; 336/20

[56] References Cited

U.S. PATENT DOCUMENTS

| 3,664,187 | 5/1972 | Goransson | 73/DIG. 2 |
| 3,903,739 | 9/1975 | Kolavcic | 73/DIG. 2 |

*Primary Examiner*—Charles A. Ruehl
*Attorney, Agent, or Firm*—Watson, Cole, Grindle & Watson

[57] ABSTRACT

A force measuring magnetoelastic transducer includes a core of magnetostrictive material with apertures, in which excitation and measuring windings are arranged, and between which a measuring zone is formed, in which the dominating part of the magnetomotive force is consumed and in which the stress therefore determines the output signal of the transducer. The core further includes apertures for controlling the force flux, which are so arranged that some measuring zone portions are substantially subjected to compressive stress and other measuring zone portions are substantially subjected to tensile stress when a force is acting on the transducer. Means are provided for exciting the transducer with an alternating current of such magnitude that the signals generated by said compressive and tensile stresses, within a predetermined range of load, show deviations from linearity with negative sign for compressive stress and positive sign for tensile stress. The output signals are summed in such proportions that the deviations from linearity of the signals compensate each other.

8 Claims, 14 Drawing Figures

SIGNAL PROCESSOR

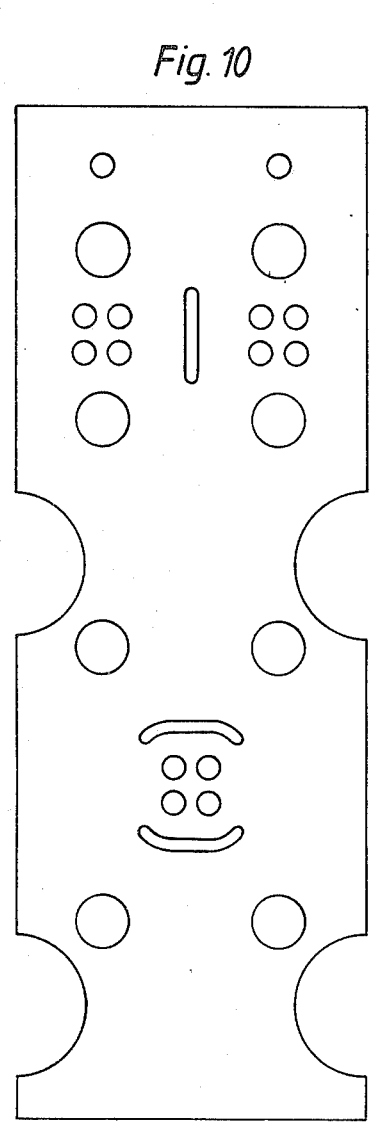
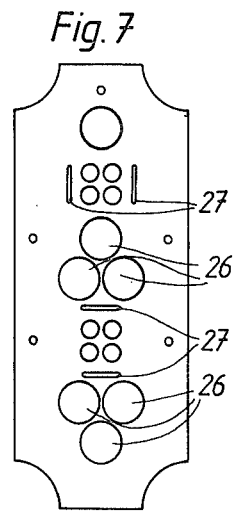
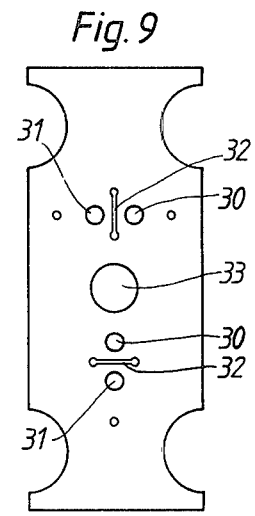
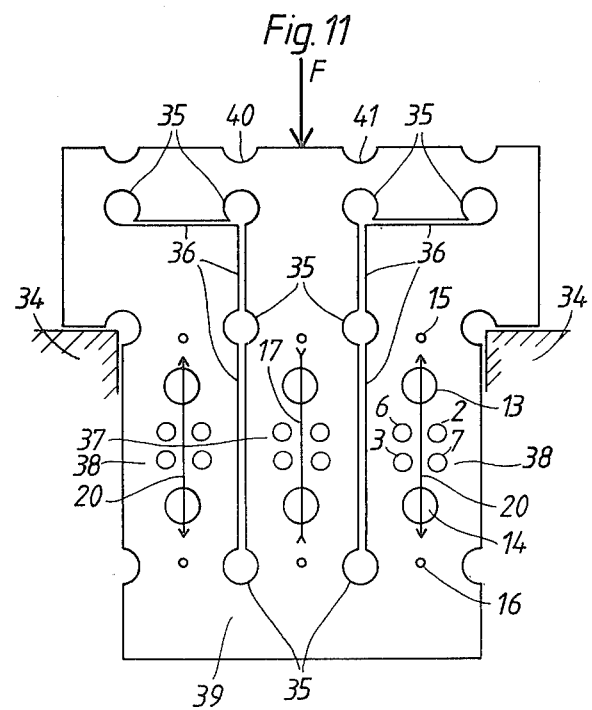

MAGNETOELASTIC TRANSDUCER WITH LINEAR AND TEMPERATURE-INDEPENDENT CHARACTERISTIC

BACKGROUND OF THE INVENTION

1. Field of the Invention

The present invention relates to magnetoelastic transducers having characteristics very close to being linear and independent of temperature.

2. Prior Art

A known magnetoelastic transducer has a core of laminated or solid magnetostrictive material which is provided with apertures passing through it for an excitation winding and a measuring winding. The excitation winding is supplied from an alternating voltage source for generating a magnetic flux in the core. The measuring winding senses the changes in the flux which occur in the core and preferably in the region between the winding apertures, the so-called measuring zone, when it is subjected to the influence of a force, which may be a compressive force or a tensile force. When the core is subjected to the influence of a force, a voltage is induced in the measuring winding, which voltage is dependent on the changes in the magnetic flux which are caused by the influencing force. Unfortunately, the relationship between the influencing force and the output signal of the transducer, that is the characteristic of the transducer, is not entirely linear but displays a slightly S-shaped characteristic in the case of a compressive load with a suitable excitation, and in the case of a tension load the characteristic proceeds continuously in a completely single-curved characteristic.

SUMMARY OF THE INVENTION

The present invention is based on the fact that the characteristic in case of a tension load shows a decreasing sensitivity with increasing tensile force, whereas the characteristic in case of a compressive load has an increasing sensitivity with increasing compressive force within a suitable operating range and with a suitable excitation.

The invention is related to different ways of utilizing these properties by a combination of a signal generated in portions of the measuring zone with mainly compressive stress with a signal generated in portions of the measuring zone with mainly tensile stress. This can be carried out in one single measuring zone, in which then certain parts of the measuring zone are subjected to a compressive stress in the usual manner and other parts of the measuring zone are subjected, through special measures, to a suitably adjusted tensile stress. This can also be carried out in such a manner that two or more measuring zones are formed in one and the same transducer, one or more of the measuring zones then being formed into compression zones so that they will have a dominating compressive stress, whereas one or more measuring zones are formed into tensile zones so that they will have a dominating tensile stress with a compressive load on the transducer. Both of these zones or groups of zones are equipped with excitation and measuring windings in a known manner and are influenced simultaneously by the force to be measured. The geometry of the core and the dimensioning and locations of the winding apertures are determined so that the characteristics for the compression zones and tension zones have as equal a linear deviation as possible, expressed in volts, although with opposed signs. Addition of the signals from the compression zones and the tension zones causes the linear deviations to almost eliminate one another, so that the output signal of the transducer is practically directly proportional to the force acting on the transducer, which, among other things, makes an electronic linearization redundant.

It is also clear that the deviations in the linearity for a tension zone and a compression zone change uniformly with the temperature within the temperature areas which are normally used for load cells for force measurement and weighing. This means that the linearity faults become independent of temperature, which is a great advantage since these faults are difficult to compensate.

The invention will now be described with reference to the accompanying drawings.

BRIEF DESCRIPTION OF THE FIGURES

FIGS. 7, 8 and 9 show other alternative embodiments of cores for transducers with one compression zone and one tension zone;

FIG. 10 shows the core of a transducer with two compression zones and one tension zone; and FIG. 11 shows the core of a transducer with one compression zone and two tension zones.

DETAILED DESCRIPTION

Figure 1A:
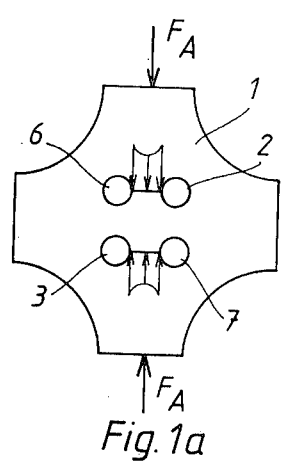
FIGS. 1a and 1b show a known transducer subjected to compressive load in the normal working direction and subjected to tensile load perpendicular thereto.
Figure 1B:
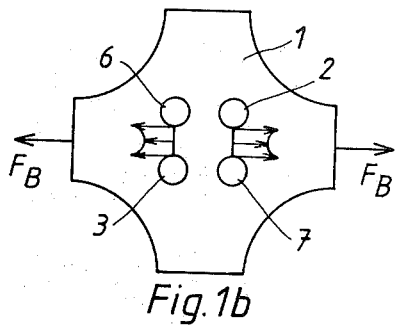
Figure 1C:
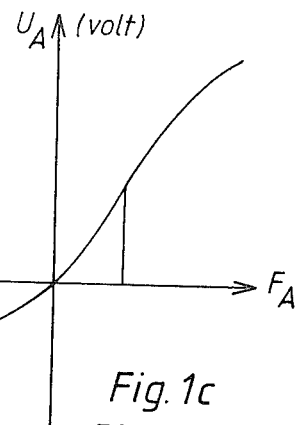
FIGS. 1c and 1d show diagrams of the output signal for the above-mentioned types of load in case of varying load.
Figure 1D:
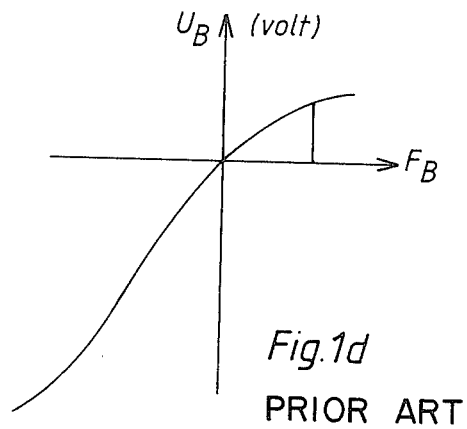

The basic principle of the invention will be explained with reference to FIGS. 1a–1d. FIGS. 1a and 1b show a transducer of the basic type which is shown and described in U.S. Pat. No. 2,895,332, but which is designed in this invention with identical force application surfaces for vertical and horizontal loads. FIG. 1a shows a normal case of compression load and the resultant distribution of the compressive stresses in the two active parts of the measuring zone. The areas between apertures 6, 3 and 2, 7, respectively, in the direction of the force are substantially passive because of the force-screening effect of the apertures. FIG. 1c shows the output signal $U_A$ from the transducer as a function of the applied compressive force $F_A$. FIG. 1b shows the transducer with unchanged orientation but which is instead subjected to a horizontal tension load with the force $F_B$ and the resultant distribution of the tensile stresses along the previously passive parts of the measuring zone. FIG. 1d shows the output signal $U_B$ for this case. As can be seen, the signal has the same sign as in FIG. 1c, but the characteristic is now single-curved and convex, that is, the second derivative is negative.

Figure 2:
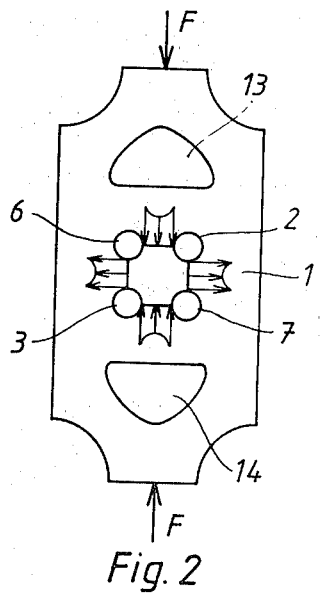
FIG. 2 shows a known transducer modified so that the distributions of the stresses according to FIGS. 1a and 1b are combined in one and the same measuring zone.

FIG. 2 shows the core of a transducer in which the two stress distributions described above have been combined in a simple manner in one and the same measuring zone. The holes 13 and 14 provided above and below the measuring zone are shown here with a substantially triangular shape to illustrate the splitting of the force flux to bring about the desired horizontal tensile stress in the measuring zone, while at the same time the vertical compressive stress in the measuring zone is reduced to the desired value. Shading apertures located above and below the measuring zone are already known per se from U.S. Pat. No. 3,093,999, but in that invention they were intended only to prevent overloading of the measuring zone and thus extend the measuring range of the transducer. Therefore, they did not have a width such as is needed in the present invention to provide a sufficient level of the tensile stress in the horizontal parts of the measuring zone to achieve linearity of the transducer.

The output signal from the transducer of FIG. 2 is equal to the sum of the signals in FIGS. 1c and 1d. By utilizing only the lower part of the load range according to FIG. 1c, where the characteristic is concave, that is, the second derivative is positive, and adapting the substantially triangular apertures 13 and 14 so that the deviations in linearity, expressed in volts in the compressive stress and tensile stress signals, are equally large, these deviations will substantially neutralize each other when summing the signals since they have different signs.

Figure 3:
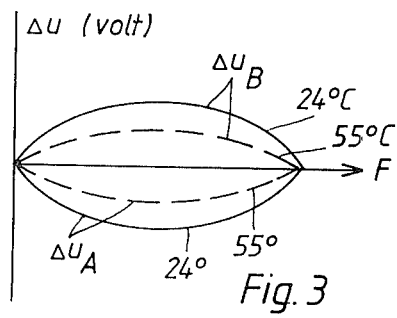
FIG. 3 shows the deviations from the linearity regarding the output signals for the two types of load within the force interval to be used and at two different temperatures.
Figure 4:
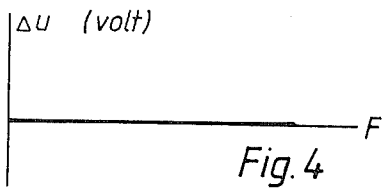
FIG. 4 shows the sum of the curves according to FIG. 3.

FIG. 3 shows the deviations, expressed in volts, from the straight line exhibited by the two part signal curves within the range of work of the transducer. The deviations are dependent on temperature in such a way that they decrease with increasing temperature. The Figure shows curves for 24° C. and 55° C. FIG. 4 shows the resultant signal after summing the respective signals shown in FIG. 3. As can be seen, a summation signal is formed, where the deviations from a straight line are negligible.

Figure 5:
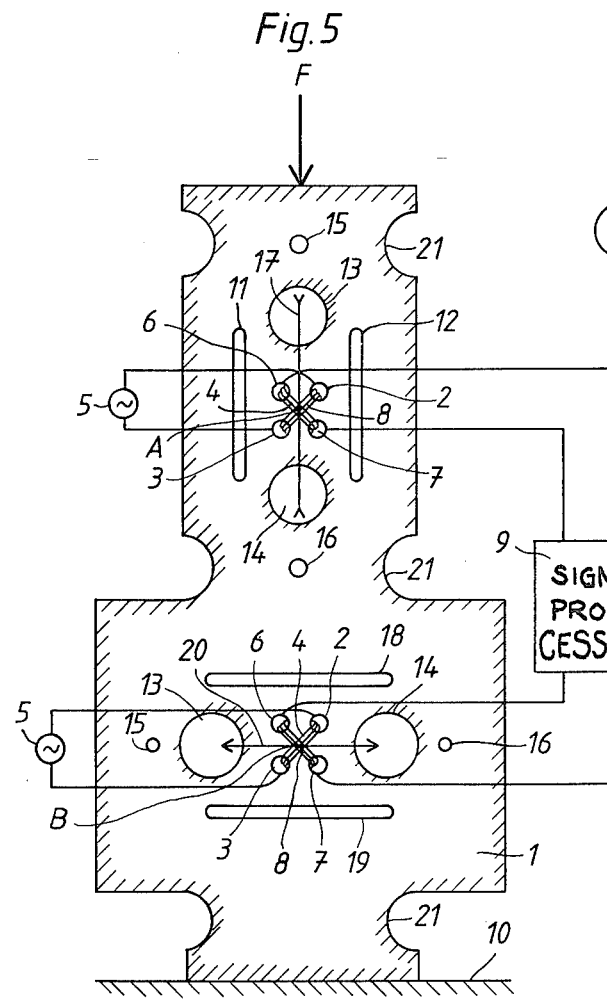
FIG. 5 shows a transducer which is influenced by a force F and constructed with a compression zone and a tension zone.

FIG. 5 shows the core 1 of a transducer according to the invention with a compression zone A and a tension zone B. Each zone is provided with two apertures 2 and 3 for an excitation winding 4 which is supplied from an alternating voltage source 5. Additionally, there are two apertures 6 and 7 for a measuring winding 8 which is connected to a signal processing device 9 which may be provided, in conventional manner, with a registering and/or indicating instrument. The measuring zone refers to the area of the core which is located between apertures 2, 3, 6 and 7. The transducer is shown here supported on a firm base 10 and influenced by a compressive force F. To achieve as pure compressive stresses as possible in the compression zone A, two vertical slots 11, 12 are provided on the sides. Additional stress-relieving apertures 13, 14 are arranged above and below the compression zone in a conventional manner. In this way a considerable part of the force F is shunted away from the measuring zone A, so that the material there is subjected to a lower stress than in the surrounding portions. This results in a considerably increased operating range for the transducer. Above and below holes 13 and 14, respectively, there are provided smaller apertures 15 and 16, respectively, for a compensation winding for hysteresis faults in the transducer. This winding is not shown here since it, as well as its mode of operation, is described in U.S. Pat. No. 3,903,739. The two-way arrow 17 indicates that zone A is a compression zone. This arrow 17 indicates the direction and the sign of the dominating principal stress in the measuring zone.

In a similar manner, tension zone B is provided with horizontal slots 18, 19 which prevent compressive stresses from influencing measuring zone B. The relieving apertures 13 and 14 as well as apertures 15 and 16 are located in the tension zone adjacent to the measuring zone, since the stress generated by force F in zone B occurs as a horizontal tensile stress. The two-way arrow 20 indicates that the zone is a tension zone. This arrow 20 indicates the direction and the sign of the dominating principal stress in the measuring zone. By varying the size, shape and location of the relieving apertures 13, 14 in relation to the measuring zone, and because of the geometric shape of the core, the absolute magnitude and mutual relationship of the principal stresses in the measuring zones can be varied. FIG. 5 is an example of a possible embodiment of the external geometry of the transducer by providing indentations 21 in the outer contour of the core. These indentations may have different shapes, sizes and locations.

Figure 6:
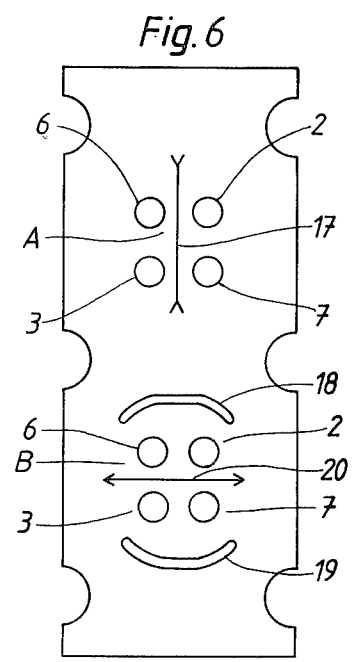
FIG. 6 shows a variation of the core for a transducer according to FIG. 5.

FIG. 6 shows another example of the embodiment of the core. A compression zone A and a tension zone B are shown. The latter zone is created by means of slots 18, 19 which are shown curved in this case.

FIG. 7 shows a further example of a transducer core with a compression zone and a tension zone. The shielding of the compressive forces from the tension zone is performed by means of combinations of punched-out holes 26 and slots 27 which are also used for controlling the mechanical force flux in the compression zone.

Figure 8:
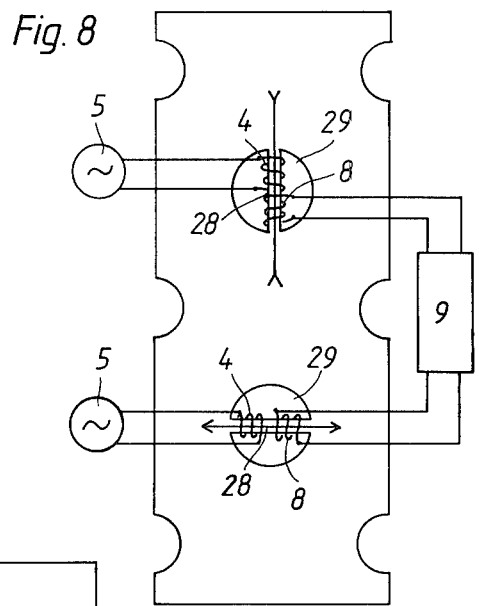

The transducer according to FIG. 8 has the force-sensing portions in the measuring zones formed as diametrical beams 28 in relatively large, preferably round holes 29, and the substantially semicircular portions of the holes, which are defined by the beams, serve as force flux controlling slots. The excitation and measuring windings 4 and 8, respectively, are arranged around the beams 28.

FIG. 9 shows a transducer in which the windings in the compression portion as well as the tension portion are located in only two apertures in addition to the previously mentioned windings for compensating hysteresis. A slot 32 is provided between the two apertures 30 and 31 for the windings. Slot 32 is vertical in the compression portion to prevent tensile stresses from occurring in the measuring zone, and is horizontal in the tension zone to prevent the vertical compressive stresses from influencing the tension zone. A stress-relieving aperture 33 is provided between the two zones.

FIG. 10 shows an example of a transducer core with two compression zones in parallel and one common tension zone. A vertical gap runs between the two compression zones to screen the two zones from each other.

The transducer core according to FIG. 11 is intended to be suspended from two fixed supports 34 and to be influenced by force F which may act along an extended portion between recesses 40 and 41 on the upper surface of the transducer. By a number of holes 35 and slots 36 passing therebetween, the core is divided into a central, compressed portion 37 and two outer, tensioned portions 38 parallel thereto. Each portion is provided with apertures 2, 3, 6, 7 for windings, relieving apertures 13, 14 and apertures 15, 16 for the compensating winding, as has been described with reference to FIG. 5. The three portions are interconnected at their lower end by means of the lower portion of the core which forms a relatively rigid yoke 39 at that point. The force F acting on the transducer is transmitted via the central, compressed portion 37, the yoke 39 and the two tensioned portions 38 to the fixed support 34. The upper portions of the transducer at the sides of the load-carrying portion between 40 and 41 serve as side-stabilizing diaphragms which absorb only a minor part of the applied force.

What is claimed is:

1. A force measuring magnetoelastic transducer for generating an output signal dependent on a mechanical force acting on the transducer, comprising:

a core of magnetostrictive material including at least two groups of first apertures, each group including excitation and measuring windings and between which at least one measuring zone is formed, in which the dominating part of the magnetic flux appears and in which the stress therefore determines the signal from the measuring winding;

said core further including second apertures other than said two groups of first apertures for controlling the force flux, and being arranged in spaced relation from said two groups of first apertures to form at least one measuring zone substantially subjected to compressive stress and to form at least one measuring zone substantially subjected to tensile stress when a force is acting on the transducer;

means for exciting each excitation winding with an alternating current having a magnitude such that the signals generated in said measuring windings by said compressive and tensile stresses within a predetermined range of load deviate from linearity with one polarity signal for compressive stress and the opposite polarity signal for tensile stress; and means for summing said signals generated in said measuring windings in such proportions that the deviations from linearity of said signals compensate each other.

2. A transducer according to claim 1 wherein said second apertures further include slots for controlling the mechanical force fluxes in the core, and stress-receiving apertures for shunting the mechanical force fluxes through the respective measuring zones for controlling the relation between said compressive and tensile stresses.

3. A transducer according to claim 1, wherein said core comprises a plurality of separate measuring zones which include at least one measuring zone substantially subjected to a compressive stress and at least one measuring zone substantially subjected to a tensile stress, said second apertures further including slots for controlling the mechanical force fluxes in the core and stress-relieving apertures for shunting the mechanical force fluxes through the respective measuring zones for controlling the relation between said compressive and tensile stresses.

4. A transducer according to claim 3, wherein at least some of said slots for controlling the force fluxes through the measuring zones substantially subjected to compressive stress are substantially parallel to the force acting on the transducer and the other of said slots for controlling the force fluxes through the measuring zones substantially subjected to tensile stress are substantially perpendicular to the force acting on the transducer.

5. A transducer according to claim 3, wherein a measuring zone subjected to a compressive stress and a measuring zone subjected to a tensile stress are arranged linearly one after the other in the direction of the force acting on the transducer and wherein the compressive stress is perpendicular to the tensile stress.

6. A transducer according to claim 3, wherein said measuring zones include two parallelly spaced zones substantially subjected to a compressive stress and a zone subjected substantially to a tensile stress perpendicular thereto.

7. A transducer according to claim 3 including three portions in parallel spaced relationship, each of said portions including a measuring zone, one of said measuring zones being subjected to a compressive force and the other two measuring zones being subjected to a tensile force, said three portions being connected to each other at respective ends thereof by relatively weak side-stabilizing diaphragm elements.

8. A transducer according to claim 3, including three portions in parallel spaced relationship, each portion including a measuring zone, one of said zones being subjected to a tensile force and the other two zones being subjected to a compressive force, said three portions being connected to each other at respective ends thereof by relatively weak side-stabilizing diaphragm elements.

* * * * *